July 31, 1951 R. G. BIELENBERG 2,562,594

LINE AND STATION DETECTING APPARATUS

Filed May 11, 1949 3 Sheets-Sheet 1

*INVENTOR.*
Raymond G. Bielenberg

BY
Smith, Olsen & Baird
Attys.

July 31, 1951 R. G. BIELENBERG 2,562,594

LINE AND STATION DETECTING APPARATUS

Filed May 11, 1949 3 Sheets-Sheet 2

INVENTOR.
Raymond G. Bielenberg
BY
Smith, Olsen & Baird
Attys.

*INVENTOR.*
Raymond G. Bielenberg
*BY*
Smith, Olsen & Baird
Attys.

Patented July 31, 1951 2,562,594

UNITED STATES PATENT OFFICE 2,562,594

LINE AND STATION DETECTING APPARATUS

Raymond G. Bielenberg, Berwyn, Ill., assignor to Automatic Electric Laboratories, Inc., Chicago, Ill., a corporation of Delaware Application May 11, 1949, Serial No. 92,644

26 Claims. (Cl. 179—18)

Figure 1:
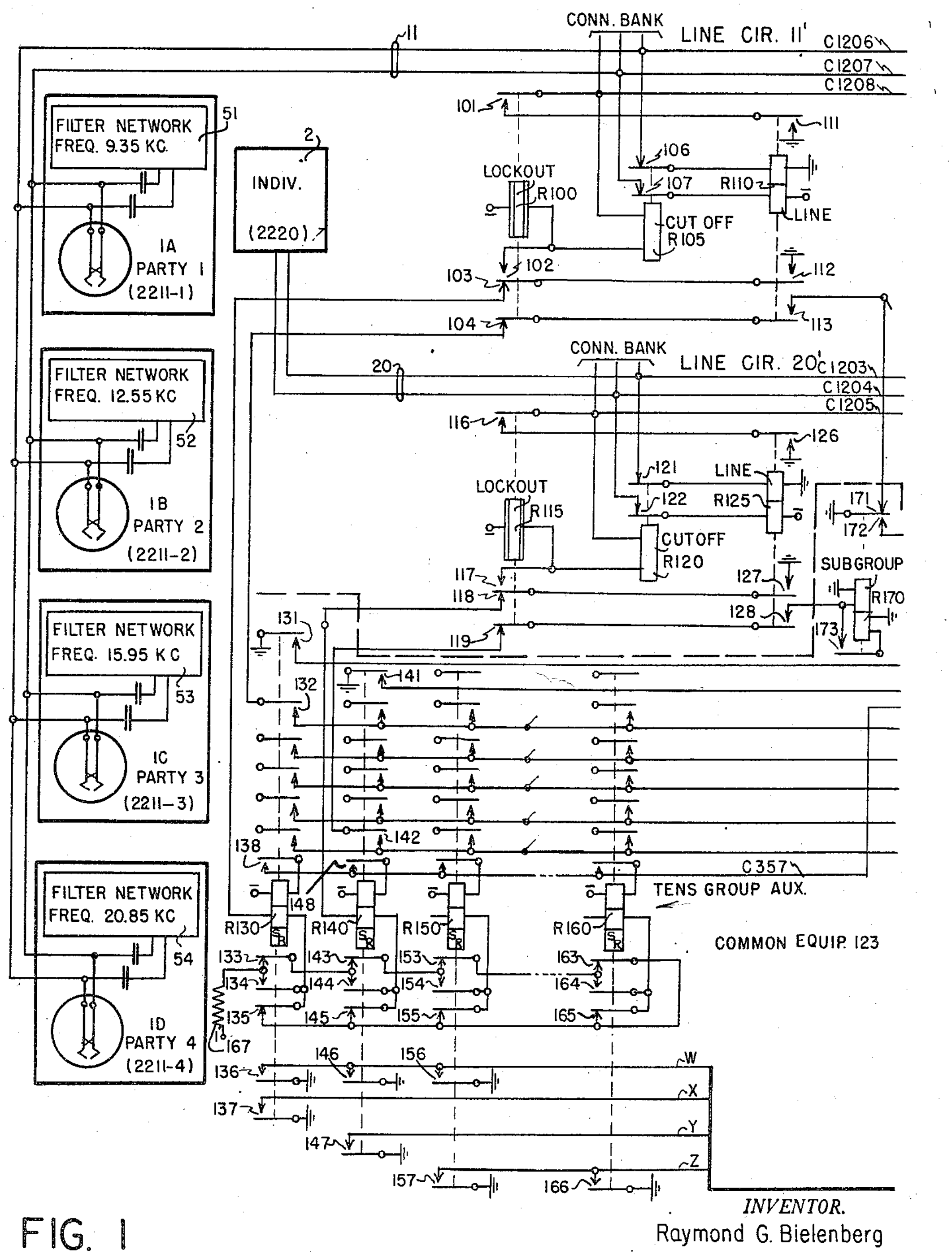

The present invention relates to telephone systems and more particularly to those systems in which the numerical designation of a calling subscriber line is automatically determined and registered as the result of the extension of a telephone connection from a calling subscriber station. More particularly, the present invention relates to line identifying apparatus adapted to be incorporated in an automatic recording telephone system of the type disclosed in the John E. Ostline Patent No. 2,385,228, granted September 18, 1945.

In an automatic recording telephone system, such, for example, as that disclosed in the above-mentioned Ostline Patent, line identifying apparatus is provided which is common to all of the subscriber lines of the system and which is entirely separate from the exchange switching apparatus over which the telephone connections are completed from the calling subscriber lines to desired called subscriber lines.

While the line identifying apparatus incorporated in this system is entirely satisfactory in operation under ordinary operating conditions, it fails to take advantage of the normal operation of the exchange switching apparatus which is utilized to connect a calling subscriber line to the central office switching apparatus for the purpose of setting up any desired connection.

Accordingly, it is an object of the present invention to provide in an automatic recording telephone system improved line switching apparatus in the central office which will automatically connect a calling subscriber line to the central office equipment and which will automatically register in the central office the identity of the calling subscriber line incident to the above operation.

Another object of the invention is to provide in a telephone system of the type noted an improved line finder switching mechanism and associated common finder control equipment which is directively operated in response to a call on any subscriber line to connect with the particular calling line and to simultaneously register the identity of the particular calling line.

A further object of the invention is to provide in a telephone system of the character noted improved line finder switching apparatus and common finder control equipment therefor of the all-relay type which includes line identifying equipment arranged to determine the multi-digit designation individual to a calling subscriber line and to register the designation in the central office register translator mechanism.

A further object of the invention is to provide in a telephone system arranged to identify the designation of a calling subscriber line a new and novel arrangement for automatically determining the identity of the particular calling subscriber station on a calling line in the event the calling subscriber line is of the party type.

A still further object of the invention is to provide in a calling subscriber station identifying arrangement of the type noted above in which the identification of the stations on calling subscriber lines of the party type is determined by means of filter networks which are selectively tuned to respond to different station identifying signals corresponding to the different stations provided on any party line.

Further objects and features of the invention pertain to the particular arrangement of the circuit elements of the system whereby the above-outlined and additional features are attained.

Figure 2:
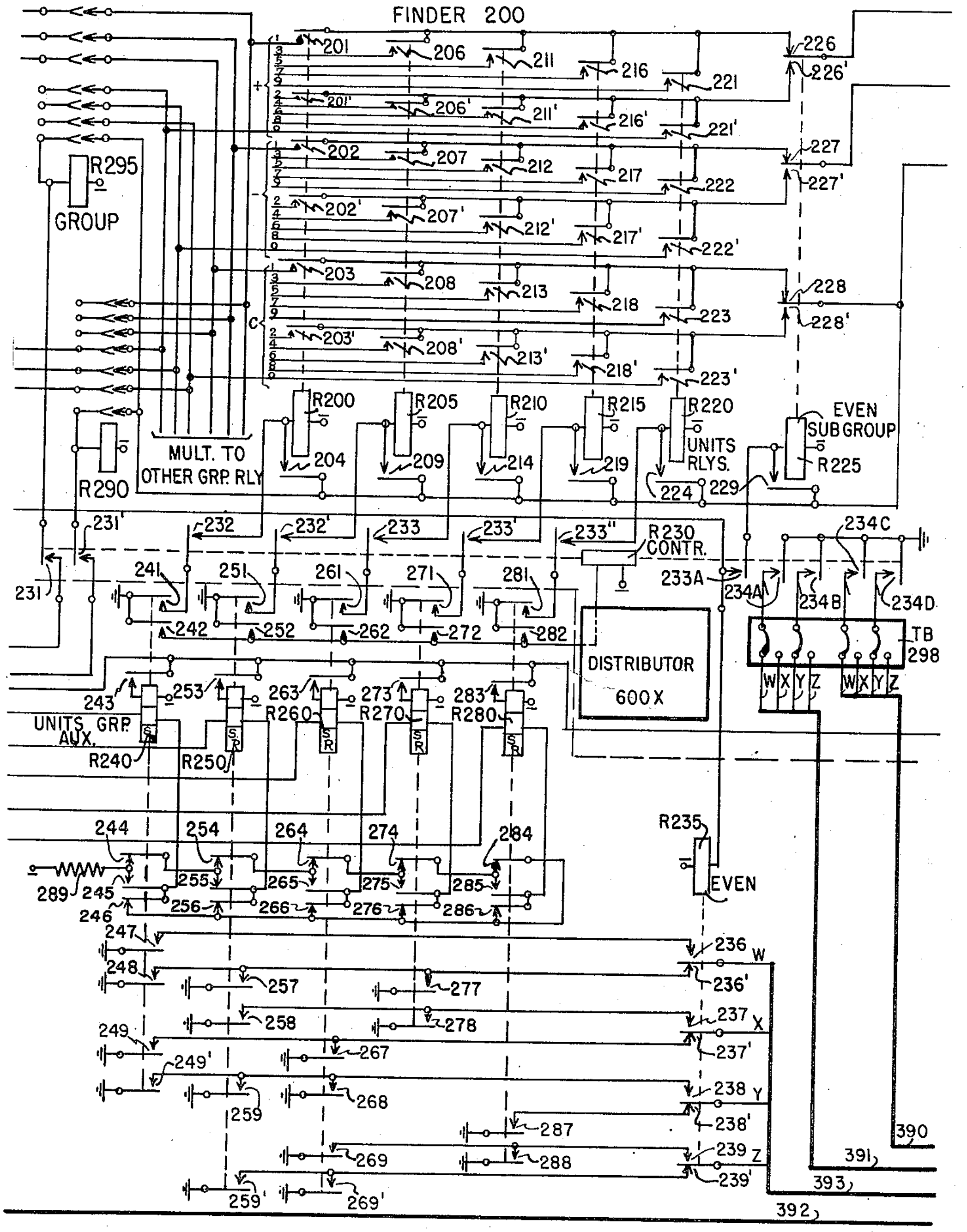
Figure 3:
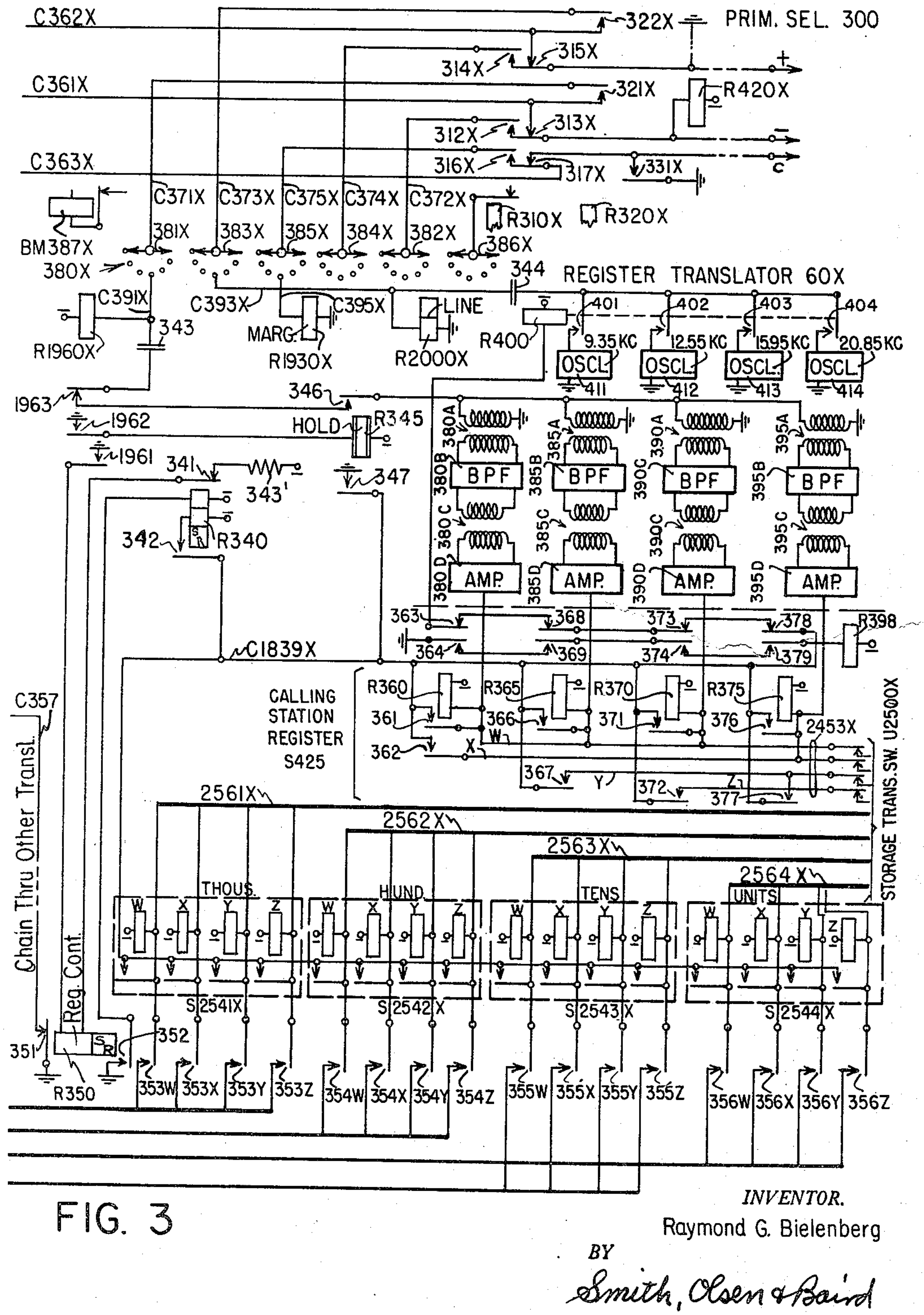

The invention both as to its organization and method of operation together with further objects and advantages thereof will best be understood by reference to the following specification taken in connection with the accompanying drawings, in which Figs. 1 to 3, inclusive, illustrate the apparatus incorporated in the telephone system which apparatus has incorporated therein the features of the invention as briefly outlined above.

Considering now the general operation of the telephone system disclosed in Figs. 1 to 3, inclusive. The removal of the receiver at a calling subscriber station will operate a line relay in an associated line circuit and thus cause the common equipment 123 and distributor 600X to select an idle finder, such as the finder 200. Under control of the common equipment and distributor, the finder 200 is selectively operated to connect with the particular calling subscriber line and connect the line through to the associated primary selector 300. Incident to the extension of the connection from the calling subscriber line through the finder 200 to the selector 300, a register translator, such as the register translator 60X is automatically connected to the calling subscriber line by means of the register translator selector 380X. The apparatus is now in condition to receive the digits of the desired called subscriber number and to register the same in the register translator 60X in the manner described in the above-mentioned Ostline patent. In addition to the foregoing, the common equipment and distributor, which has selectively operated the finder 200, will now transfer, in a manner to be described hereinafter, the multi-digit designation of the particular calling subscriber line to the registers S2541X to S2544X, inclusive, in the register translator 60X and the common equipment and distributor are released for further calls.

The register translator 60X is provided with a plurality of oscillators, 411 to 414, inclusive, each of which is continuously operating to generate a frequency corresponding to the identity of a particular one of the four subscriber stations on a party line. As soon as the dial at a calling party subscriber station is actuated to transmit impulses corresponding to the digits of a called number, the filter network thereat is effectively bridged across the conductors of the party line thereby to cause the calling station registers S425 in the register translator 60X to operate and register the identity of the particular calling subscriber station on the party line. The remaining operations whereby the register translator 60X operates in order to transmit the identity of the calling subscriber line and, if necessary, the identity of the calling subscriber station on a calling party line for the purpose of recording the information is described in detail in the above-mentioned Ostline patent. The operation of the register translator 60X in setting up a telephone connection and in causing the recording of items of information pertaining to a telephone connection is the same as described in the previously mentioned Ostline patent and will not be described herein.

Considering now the detail operation of the circuits and apparatus of the telephone system illustrated in Figs. 1 to 3, inclusive, it is noted that the system includes a party subscriber line and an individual subscriber line, each of which is indicated respectively as 11 and 20. The party line 11 is connected at the central office in a line circuit 11′ comprising the relays R100, R105 and R110. The four schematically illustrated subscriber stations 1A, 1B, 1C and 1D are also connected to the line 11 and each station includes the usual hand set provided with a conventional dial whereby each of the subscribers at the respective stations may control the central office equipment to extend telephone connections to desired called subscriber stations. In addition to the foregoing, each subscriber station of the party type is provided with a filter network which is tuned to respond only to predetermined frequency in order to identify the particular station when the calling device thereat is moved from its normal resting position.

The individual subscriber line 20 terminates in the central office in a line circuit 20′ comprising the relays R115, R120 and R125. The line 20 is individual to the subscriber station 2. The individual subscriber station 2 is provided with the usual hand set which includes the conventional dialing mechanism, but since only one station is provided on the individual line 20, it is not necessary to provide a filter network thereat.

Each subscriber line in the telephone system, such as the lines 11 and 20, is accessible to finder switches in the central office for the purpose of completing connections therefrom and is also accessible to connector switches (not shown) in the central office for the purpose of completing connections thereto. Thus, the line 20 terminates in the line circuit 20′ individual thereto and it is connected to contacts of a group relay in the finder switch 200. Similarly, the line 11 terminates in the line circuit 11′ individual thereto and is connected to the contacts of a group relay in the finder switch 200. Each of the lines 11 and 20 is also terminated in the connector banks having access thereto.

Each of the finder switches, such as the finder 200, is of the fully directive all-relay type including group and unit relays and a subgroup relay for performing the line selecting functions. The subscriber lines terminating at each finder switch are arranged in groups of ten lines and the lines in each group terminate at the contact springs of a group relay. More particularly, the finder switch 200 comprises ten group relays corresponding to and including the two group relays R290 and R295. Each group relay individually having contact springs for terminating the conductors of ten subscriber lines. While the group relays may be of any desired commercial type having the required number of contact springs, preferably these relays are of the improved form disclosed and claimed in the Herbert F. Oberfell Patent No. 2,135,832 granted November 8, 1938. The subscriber lines of each group are divided into two equal subgroups respectively comprising the odd numbered lines and the even numbered lines and through the provision of a subgroup relay in each finder switch a group of five unit relays is sufficient to permit the selection of any desired one of a selected group of ten subscriber lines. Thus, the finder switch 200 comprises a subgroup relay R225, five unit relays R200, R205, R210, R215 and R220 and ten group relays, such as the relays R290 and R295. Each of the unit relays mentioned above is operative to select either of two lines in a selected group of ten lines depending upon the operated or non-operated condition of the subgroup relay R225. The finder switch also includes the control relay R230 which is arranged to be controlled by way of the units group auxiliary relays of the common equipment 123 and is operative to initiate the operation of the finder switch 200 to seize and connect with a calling subscriber line.

The common equipment 123 includes a plurality of tens group auxiliary relays which are arranged to be energized over start circuits controlled by the line circuits associated with the respective lines terminating at the telephone exchange. These relays are selectively operative in response to the selective combination of the start circuits and individually function to condition for operation a particular group relay included in a finder. More particularly, ten tens group auxiliary relays, including the four relays R130, R140, R150 and R160 are provided which individually correspond to the ten group relays included in the finder switch of each finder selector link.

The common equipment 123 also includes a group of five units group auxiliary relays R240, R250, R260, R270 and R280 which individually correspond to the unit relays included in the finder switch of each link and are operative to condition the corresponding unit relays in the finder switch of an assigned link for operation. The operation of the subgroup relay in the finder switch of an assigned link is dependent upon the operated or non-operated condition of a subgroup auxiliary relay R170 provided in the common equipment 123. The subgroup auxiliary relay R170 is arranged to be operated over those start circuits which are adapted to be completed in the line circuits terminating the subscriber lines in predetermined ones of the line subgroups. Specifically, the arrangement of the apparatus is such that when a calling condition is created on one of the subscriber lines terminating at the exchange, start circuits are completed by the line relay individual to the calling line for causing the operation of one of the tens group auxiliary relays R130, R140, etc. which correspond to the group of lines including the calling line and for energizing one of the units group auxiliary relays R240, R250, etc. which is operative to select the particular calling line. If the calling line is in one subgroup of its particular group of lines, for example, the even numbered subgroup, the subgroup auxiliary relay R170 is operated over the completed start circuit, but if the calling line is in the other subgroup, for example, the odd numbered subgroup, the subgroup auxiliary relay R170 is not operated. In its operated condition, the subgroup auxiliary relay R170 conditions the subgroup relay included in the finder switch of the assigned link for operation.

A link allotter or distributor 600X is also provided which is arranged to assign an idle one of a plurality of finder selector links for use in seizing the next calling line immediately after a previously assigned link has been operated to seize a calling line and also to prevent the assignment of a link for the use of a calling line in the event an idle link is not available. In the present example it may be assumed that the distributor 600X is operative successively to assign the links to the use of calling lines and after the tenth link has been assigned, the distributor 600X will automatically re-cycle itself in order to provide for reassignment of idle ones of the links until all of the links are busy. For a detailed description and disclosure of the distributor 600X schematically illustrated in Fig. 2, reference may be had to the Frank Kessler Patent No. Re. 22,813 reissued December 3, 1946.

Each of the finder selector links comprises the all-relay finder switch arrangement described above and a primary selector mechanism of the type schematically illustrated in Fig. 3. For example, the finder selector link includes the finder 200 and the primary selector 300. The primary selector 300 includes the usual Strowger type mechanism, including vertical, rotary and release magnets, whereby the wipers of the selector switch may be advanced step-by-step in a vertical direction to a position opposite a level corresponding to the number of impulses transmitted thereto and will automatically rotate the wipers over the contacts of the selected level to select an idle trunk extending to a succeeding selector or trunk repeater.

Each primary selector, such as the selector 300, also includes a register translator selector which is arranged to connect an idle register translator to the calling subscriber line for the purpose of registering the digits of a desired called subscriber number as dialed by the calling subscriber. In the present example, the register translator selector 380X is individually associated with the primary selector 300 and by means of the magnet BM387X will rotate its wipers to search for and find an idle register translator, such as the register translator 60X. The primary selector 300, the register translator selector 380X and the register translator 60X have been schematically illustrated and for a detailed description and disclosure of these circuits reference may be had to the corresponding circuits disclosed in the above-mentioned Ostline Patent No. 2,385,228. Certain of the relays and apparatus included in the primary selector 300, the register translator selector 380X and the register translator 60X are exactly the same as those disclosed in the Ostline patent noted above and have been given like reference character followed by the suffix "X" in order more readily to identify the corresponding equipment. The thousands, hundreds, tens and units registers S2541X, S2542X, S2543X and S2544X are provided in the register translator 60X to register the four digits of the numerical portion of the directory number of a calling subscriber line in the manner to be described hereinafter. In addition to the foregoing, the register translator 60X is provided with four schematically illustrated oscillators 411, 412, 413, and 414 and four filter networks 380B, 385B, 390B and 395B which cooperate to identify the number of the calling station on a calling party line. In order to register the number of the calling station on a party line, the register translator 60X is also provided with a calling station register S425 comprising four station registers R360, R365, R370 and R375. Finally, it is noted that the above-mentioned registers terminate in five cables designated 2453X, 2561X, 2562X, 2563X and 2564X which are connected in the manner disclosed in the above-mentioned Ostline patent to a storage transfer switch U2500 disclosed therein whereby the register translator 60X transfers the items of information pertaining to the telephone connection, including the directory number of the calling subscriber line and station number to a subsequent point in the completed telephone connection for the purpose of producing a record of the telephone connection.

It will now be assumed that the subscriber at substation 1A on the party line 11 initiates a call by removing the receiver from the switchhook of the associated telephone instrument thereby completing the usual loop circuit between the subscriber station and the line relay individual to the party line. More particularly, the line relay R110 individual to the party line 11 is operated in response to the removal of the receiver by the subscriber at substation 1A. Upon operating, the relay R110, at its contacts 112, completes a circuit by way of the contacts 103, the lower winding of the tens group auxiliary relay R130, the contacts 135, 163, 153, 143 and 133 and the resistor 167 to battery. Before continuing with the description of operation, it will be assumed that the link including the finder 200 and the primary selector 300 has been assigned by the distributor 600X to the use of the present calling subscriber.

When the above-traced circuit has been completed for the lower winding of the tens group auxiliary relay R130, the relay operates and, at its contacts 134, completes a locking circuit for itself which is independent of the contacts of all of the remaining tens group auxiliary relays and simultaneously therewith, at its contacts 133 and 135, it interrupts the chain circuit to prevent operation of any other tens group auxiliary relay until the operated relay R130 is again restored to normal. Also, at its contacts 131, the relay R130, upon operating, prepares a point in the circuit for operating the group relay R295 in the finder 200. At its contacts 132, the relay R130 prepares a point in the circuit for operating one of the units group auxiliary relays corresponding to the subgroup including the calling subscriber line. In the present example, the line relay R110, upon operating, in addition to completing the operating circuit for the tens group auxiliary relay R130, at its contacts 113, also completes a circuit which may be traced from ground by way of the contacts 171, 113, 104 and 132, the lower winding of the units group auxiliary relay R240, the contacts 246, 284, 274, 264, 254 and 244 and the resistor 289, to battery. The relay R240 operates when the above-traced circuit is completed and, at its contacts 245, completes a locking circuit for itself which is independent of the contacts of the remaining units group auxiliary relays and simultaneously therewith, at its contacts 244 and 246, it interrupts the chain circuit in order to prevent operation of any of the remaining units group auxiliary relays until the relay R240 has been restored to normal.

As a further result of the operation of relay R240, at its contacts 242, it completes a circuit by way of the distributor 600X for operating the control relay R230 of the assigned link. The control relay R230 is individual to the link comprising the finder 200 and the primary selector 300. In the distributor 600X the above-described circuit for controlling the relay R230 controls the distributor to assign the next link to be used in the manner described in the previously mentioned Kessler patent. In response to the operation of the control relay R230 the various contacts thereon are closed in order to connect the various group relays of the finder 200, such as the group relays R295, R290, etc., to the contacts of the various tens group auxiliary relays in the common equipment 123 and also to connect the units relays in the finder 200 to the various contacts of the units group auxiliary relays in the common equipment 123. More specifically, at the contacts 231, the relay R230 completes a circuit including the grounded contacts 131 then by way of the contacts 231 and the winding of the group relay R295, to battery. The group relay R295 operates over the above-traced circuit to close its contact springs connected to the subscriber lines numbered 10 to 19, inclusive. Also, at its contacts 232, the relay R230 completes a circuit including the grounded contacts 241 for operating the units relay R200 thereby to connect the calling line 11 to the assigned link including the finder 200.

With the group relay R295 and the unit relay R200 in the finder 200 in their operated positions, the subscriber line 11 is extended by way of closed contacts on the above-mentioned group and unit relays to the conductors C361X and C362X of the primary selector 300 portion of the assigned link and then by way of the contacts 313X and 315X to the winding of the line relay R420X in the primary selector 300. The circuit for operating the line relay of the primary selector 300 may be traced from battery by way of the winding of the relay R420X, contacts 313X, the conductor C361X, the contacts 227 and 202, the closed contacts of the relay R295, the conductor C1207, the subscriber line 11, the substation of the calling subscriber and returning by way of the conductor C1206, the contacts of the group relay R295, the contacts 201 and 226, the conductor C362X, and the contacts 315X, to ground. The line relay R420X operates over the above-described loop circuit including the calling subscriber line and, incident to its operation, a ground potential, at the contacts 331X, is returned by way of the contacts 317X to the conductor C363X. One branch of the circuit from the grounded conductor C363X extends by way of the contacts 228 and 203, the contacts of the operated group relay R295, the conductor C1208, the winding of the cut-off relay R105 and the lock-out relay R100, to battery. In this branch of the circuit the lock-out relay R100 and the cut-off relay R105 are operated. The other branch of the circuit including the grounded conductor C363X extends by way of the contacts 204 to the winding of the units relay R200 in order to maintain the latter relay in its operated position and also by way of the contacts of the group relay R295 and the winding thereof, to battery. The last-mentioned circuits retain the units relay R200 and the group relay R295 in their operated positions over circuits which are entirely independent of their initial operating circuits.

Returning now to the above-mentioned circuit for operating the lock-out relay R100, it is to be noted that upon operating the relay opens, at its contacts 103 and 104, the previously described start circuits for controlling the common equipment 123. Also in response to the operation of the cut-off relay R105, at its contacts 106 and 107, it disconnects the line relay R110 from across the conductors of the calling subscriber line 11 thereby to cause the relay R110 to restore to normal. It should also be noted that the presence of ground potential upon the conductor C1208, which caused the operation of the lock-out relay R100 and the cut-off relay R105 serves to busy the calling line 11 to all of the connectors in the system having access thereto.

Inasmuch as the lock-out relay R100 has disconnected the start circuits for the common equipment 123, at the contacts 103 and 104, the operated tens group auxiliary relay R130 and the operated units group auxiliary relay R240 would restore to normal except for the fact that locking circuits have been completed for the upper windings of the above-named relays. This locking circuit may be traced from ground at contacts 351 of the register control relay R350 in the register translator 60X and then by way of chain contacts (not shown) of similar register control relays in all other register translators, to the contacts 243 and 138 of the relays R240 and R130 and the upper windings of these relays to battery. Accordingly, the units group auxiliary relay R240 and the tens group auxiliary relay R130 are maintained in their operated positions under control of the register control relays in the register translators.

Returning now to the operation of the line relay R420X in the primary selector 300 it should be understood that as a result of its operation, the magnet BM387X of the register translator selector 380X is self-interruptedly operated to advance its wipers step-by-step to find an idle register translator. It will be assumed that the magnet BM387X has advanced its wipers into engagement with the contacts in the associated contact banks terminating the conductors of the register translator 60X. As soon as the register translator selector 380X has seized the register translator 60X, the relays R310X and R320X in the primary selector are operated to transfer the conductors C361X, C362X and C363X from the primary selector 300 to the register translator 60X. More specifically, the conductor C362X is now extended by way of the contacts 322X, the wiper 383X, the conductor C393X and the lower winding of the relay R2000X, to ground. The conductor C361X is extended by way of the contacts 321X, the conductor C371X, the wiper 381X, the conductor C391X, and the winding of the relay R1960X, to battery. Finally, the conductor C363X is extended by way of the contacts 316X, the conductor C375X, the wiper 385X, the conductor C395X and the winding of the marginal relay R1930X, to ground. The relays R1960X and R2000X are operated when the above-described transfer is completed but the marginal relay R1930X does not operate at the present time. However, ground potential applied by way of the winding of the relay R1930X to the conductor C363X maintains the group relay R295 and the unit relay R200 in their operated positions and it also retains the lock-out relay R100 and the cut-off relay R105 in their operated positions. For a more detailed description of the operation of the primary selector 300, the register translator selector 380X and the register translator 60X reference may be had to the above-mentioned Ostline patent and the description therein of the operation of the primary selector 50, the register translator selector 380 and the register translator 60.

Referring again to the above-described operation of the relay R1960X it is noted that, at its contacts 1961, a circuit is completed for operating the register control relay R350. This circuit may be traced from ground by way of the contacts 1961, the winding of the slow-to-release relay R350, the contacts 341, and the resistor 343′, to battery. The relay R350, upon operating, at its WXYZ contacts 353 to 356, inclusive, connects the thousands, hundreds, tens and units registers S2541X, S2542X, S2543X and S2544X to the thousands, hundreds, tens and units cables 390 to 393, inclusive. The four sets of WXYZ conductors included in the four cables mentioned above will be marked in code form in accordance with the thousands, hundreds, tens and units digits corresponding to the directory number of the calling subscriber line. In the first place, the thousands and hundreds digits of the calling subscriber directory number will be marked in the WXYZ conductors of the cables 390 and 391 in accordance with the jumpering arrangement provided upon the terminal block TB298 and the contacts controlled by the operated control relay R230 in the finder 200. In the illustrated example, the jumpering arrangement on the terminal block TB298 is such that when the contacts 234C and 234D are closed, and the W and Y conductors of the thousands cable 390 are grounded thereby to cause the operation of the W and Y relays of the thousands register S2541X in the register translator 60X to register in code the thousands digit "2." Similarly, the contacts 234A and 234B ground the W and Y conductors of the hundreds cable 391 thereby to operate the corresponding relays in the hundreds register S2542X to register the hundreds digit "2."

Referring again to the common equipment 123, it will be recalled that the tens group auxiliary relay R130 has been operated and is retained in its operated position over a separate locking circuit including the conductor C357. At its contacts 136 and 137, the relay R130 maintains a ground potential on the W and X conductors in the four WXYZ conductors in the tens cable 392 thereby to complete operating circuits, upon the operation of relay R350, for the W and X relays in the tens register S2543X. Finally, the units group auxiliary relay R240 which is also retained in its operated position, at its contacts 248 and 249, applies ground potential to the W and X conductors of the four WXYZ conductors in the units cable 393 thereby to complete operating circuits for the W and X relays in the unit register R2544X. The operated condition of the W and X register relays in the tens and units registers S2543X and S2544X registers respectively the digit "1" corresponding to the tens and units digit of the particular calling subscriber line number.

The above-described arrangement whereby the thousands, hundreds, tens and units digits corresponding to the directory number of the calling subscriber line are transferred to the various registers in the register translator 60X occurs at the instant the relay R350 closes its various contacts included in the circuits of the register relays.

In considering the thousands, hundreds, tens and units registers S2541X to S2544X which registers respectively the thousands, hundreds, tens and units digits, it is noted that each of these registers comprises four storage relays WXYZ and each of the relays is provided with a locking circuit whereby the relay is retained in its operated position until the register translator 60X is released from the telephone connection. The WXYZ relays in the four registers are controlled over the cables 390 to 393, inclusive, in accordance with the following code:

| Digit Registered | Register Relay Operated |
|---|---|
| 1 | WX |
| 2 | WY |
| 3 | WZ |
| 4 | XY |
| 5 | XZ |
| 6 | YZ |
| 7 | W |
| 8 | X |
| 9 | Y |
| 0 | Z |

From the foregoing code table it will be understood that the thousands and hundreds digits of the calling line number will be registered in the thousands and hundreds registers S2541X and S2542X in accordance with the predetermined strapping on the terminal block TB298. Each terminal block, such as TB298, is permanently wired in accordance with the thousands and hundreds digits of the directory number of the subscribers lines which are accessible to the associated finder. It will also be understood that the tens group auxiliary relays in the common equipment 123 are selectively operated in accordance with the tens group of lines including the particular calling line. More specifically the first tens group auxiliary relay R130, at its contacts 136 and 137, will apply ground potential to the WX conductors in the tens cable 392 thereby to cause the operation of the W and X storage relays in the tens register S2543X to register the tens digit "1." The second tens group auxiliary relay R140, when operated, will apply ground potential, at its contacts 146 and 147, to the W and Y conductors in the cable 392 to register the tens digit "2" in the register S2543X. The third tens group auxiliary relay R150, the fourth, fifth, sixth, seventh, eighth and ninth tens group auxiliary relays (not shown) and the tenth tens group auxiliary relay R160 are also provided with contacts for applying ground potential to the various WXYZ conductors in the tens cable 392 thereby to register the digits "3" to "9" and "0" in the tens register S2543X in accordance with the above code table.

Referring now to the units group auxiliary relays in the common equipment 123, it is noted that five such relays are provided and designated R240, R250, R260, R270 and R280 respectively. The first unit group auxiliary relay R240 is operated in the manner previously described in accordance with the calling subscriber lines having the units digit "1" or "2" in their directory numbers. The remaining four unit group auxiliary relays are operated in accordance with calling subscriber lines having the units digit "3" and "4," "5" and "6," "7" and "8" and "9" and "0," respectively. In order to discriminate between the odd and even numbered units digits of the calling subscriber directory numbers, the even relay R235 is provided which will transfer the WXYZ conductors in the units cable 393 to different sets of contacts on the various unit group auxiliary relays so that the odd unit digit corresponding to the operated unit group auxiliary relay will be registered in the units register S2544X when the even relay R235 is in its restored position and will register the corresponding even units digit when the even relay R235 is in its operated position. More specifically, the units group auxiliary relay R240 will be in its operated position when a call is initiated on a subscriber line having the units digit "1" as part of its directory number. When this condition exists, the subgroup auxiliary relay R170 and the even relay R235 will be in their restored positions. With the relay R240 operated and the relay R235 restored, the W and X conductors in the units cable 393 are grounded to register the digit "1" in the units register S2544X. These circuits include the contacts 248 and 249 on the operated relay R240 and the contacts 236′ and 237′ on the unoperated relay R235. On the other hand, if the calling subscriber directory number has the units digit "2," that is an even numbered digit, the units group auxiliary relay R240 will be operated in the manner previously described and the subgroup auxiliary relay R170 and the even relay R235 will be in their operated positions. The relay R235 will disconnect the WXYZ conductors from circuits including the contacts 236′ to 239′ and connect these conductors to circuits including the contacts 236 to 239. Accordingly, the contacts 247 and 249′ on the operated relay R240 will apply ground potential by way of the contacts 236 and 238 to the W and Y conductors in the units cable 393 thereby to register the digit "2" in the units register S2544X. The remaining four units group auxiliary relays R250 to R280 are provided with contacts which cooperate with the various contacts on the even relay R235 so that the odd digit corresponding to the operated units group auxiliary relay will be registered in the units register S2544X when the even relay R235 is in its restored position. Furthermore, the contacts on the various operated units group auxiliary relays will also operate the units register S2544X in accordance with the even digit corresponding to the operated units group auxiliary relay when the even relay R235 is in its operated position. Accordingly, the WXYZ conductors in the cable 393 will be marked by the operated condition of any one of the unit group auxiliary relays and the operated or unoperated condition of the even relay R235 in accordance with the above code table to register any one of the units digit "1" to "9" and "0" in the unit register S2544X.

Referring again to the operation of the register control relay R350 it will be recalled that this relay operated as soon as the register translator 60X was seized and the relay R1960X was operated. The relay R350, upon operating, closed its various WXYZ contacts 353 to 356, inclusive, thereby to cause a transfer of the thousands, hundreds, tens and units digits corresponding to the directory number of the calling subscriber line from the common equipment 123 to the four registers S2541X to S2544X in the register translator 60X. At this time the various WXYZ storage relays in the registers S2541X to S2544X, inclusive, which have been operated to register the digits of the directory number of the calling subscriber line will be locked in their operated positions over a circuit including the winding of the operated storage relay, the pair of contacts shown immediately below the relay, to ground at contacts 347 of the now operated hold relay R345. The hold relay R345 was operated as soon as the relay R1960X operated, over an obvious circuit including the contacts 1962. Accordingly the various storage relays in the registers will be retained in their operated positions until the register translator 60X is released from the connection. The relay R350, upon operating, at its contacts 351, interrupts a point in the previously described chain circuit including contacts on the register control relays in each of the register translators included in the group of register translators, with the register translator 60X. When this chain circuit is interrupted, ground potential is removed from the hold conductor C357 thereby to interrupt the locking circuits for the operated tens group auxiliary relays and the operated units group auxiliary relays, which now restore to normal. These relays upon restoring will remove the marking ground potentials from the various WXYZ conductors included in the tens and units cables 392 and 393. As a further result of the restoration of the operated units group auxiliary relay, the previously described control circuit including the distributor 600X and the control relay R230 is interrupted, thereby to cause the control relay R230 to restore to normal and thus open any circuits including its contacts. Accordingly at its contacts 234A to 234D, inclusive, the relay R230 removes the marking ground potentials from the various WXYZ conductors in the thousands and hundreds cables 390 and 391.

As a further result of the operation of relay R350, at its contacts 352, it completes an obvious circuit including the upper winding of the relay R340 thereby to cause the latter relay to operate and close its contacts 342. As soon as the contacts 342 are closed, an independent locking circuit, including the contacts 347, is completed for the lower winding of the relay R340 thereby to retain the relay in its operated condition until the register translator 60X is released from the connection. At its contacts 341, the relay R340 interrupts the operating circuit for the relay R350 thereby to cause the latter relay to restore. Upon restoring, the relay R350, opens the initial operating circuit for the relay R340, at its contacts 352, but the last-mentioned relay is retained in its operated position as previously noted. Furthermore, at its WXYZ contacts 353 to 356, inclusive, the relay R350 disconnects the thousands, hundreds, tens and units registers S2541X to S2544X, inclusive, from the WXYZ conductors included in the cables 390 to 393, inclusive. Finally, at its contacts 351 the relay R350 completes a point in the chain circuit through the remaining register translators of the same group thereby to render the remaining idle translators operative to respond to other calls.

Inasmuch as the common equipment 123 has been restored to normal and the distributor 600 has assigned another idle finder selector link for use, the common equipment 123 may be utilized in controlling the newly assigned finder selector link to connect with another calling subscriber line. The remaining operations whereby the newly assigned finder selector link finds the calling line and connects the same to an idle register translator is the same as has been described hereinbefore.

In the present call it was assumed that the calling subscriber at substation 1A on the party line 11 originated the call and it has also been assumed that the directory number of the party line 11 is "2211." This directory number has been registered in the registers S2541X to S2544X, inclusive, in the register translator 60X. Since the calling subscriber at substation 1A is a party line subscriber, it is also necessary to determine the suffix digit of the calling subscriber directory number designating the particular calling party station on the calling party line. In a terminal-per-line system of the type disclosed each of the party lines is provided with four digit directory numbers designating the party line and each station on the party line is provided with an additional single digit, or letter if it is so desired, designating the particular calling station on the calling party line.

The digits comprising the directory number of the party line including the digit designating the station on the party line are all utilized in extending connections to a particular called station on any party line. In other words, the four digits designating the party line are utilized to control the automatic switching apparatus to complete a connection to the connector bank terminals individual to the four stations on a called party line. The suffix digit, that is the fifth digit in the case of party line calls, is utilized to control the connector involved in a connection to transmit a ringing frequency or a ring code which is individual to the particular called substation on a called party line.

In a toll ticketing system of the type disclosed, it is necessary to make a record of calling subscriber directory numbers when calls made from such subscriber stations are to be assessed against the calling subscriber station. Accordingly, the above-described arrangement for determining the directory number of the calling party line will be subsequently utilized to produce a record individual to the particular telephone connection which will indicate that the charge for the particular call is to be assessed against the calling party line. In order to determine which one of the stations on the calling party line has made the call, it is also necessary to determine the number of the particular calling station on the particular calling party line.

The manner in which the digit designating the calling subscriber station on a calling party line is determined will now be described. At the outset it is to be noted that each of the register translators, such as the register translator 60X, is provided with four vacuum tube oscillators or generators 411 to 414, inclusive, each of which is arranged to transmit a frequency which is not a harmonic of any of the other frequencies. More specifically, the vacuum tube oscillator or generator 411 is of the well-known type arranged to generate a frequency of, for example, 9.35 kilocycles; the oscillator 412 is designed to transmit, for example, a frequency of 12.55 kilocycles; the oscillator 413 is designed to transmit a frequency, for example, of 15.95 kilocycles; and the oscillator 414 is designed to transmit a frequency, for example, of 20.85 kilocycles. The above four oscillators correspond respectively to the four stations 1A to 1D, inclusive, connected to the party line 11 and each of the stations is provided with a filter network of conventional type and construction to pass only one of the four frequencies and to block the remaining frequencies when the filter network is bridged across the conductors of the party line 11. For example, the filter network 51 at the station 1A is designed and arranged to pass a narrow band of frequencies including 9.35 kilocycles and to block all frequencies outside of the above-enumerated band, that is, to block the bands of frequencies including 12.55 kilocycles, 15.95 kilocycles, and 20.85 kilocycles. The filter network 52 at the second party subscriber substation 1B is also arranged to be connected across the line conductors of the party line 11 when the subscriber at this station actuates the calling device thereat to pass the narrow band of frequencies including 12.55 kilocycles and to block all of the frequencies including the bands containing the remaining enumerated frequencies. The remaining filter networks 53 and 54 provided respectively at the third and fourth party subscriber substations 1C and 1D on the party line 11 are each designed to pass respectively 15.95 kilocycles and 20.85 kilocycles and to block the remaining three frequencies when a call is made by the subscribers at the respective stations in the same manner as has been described above.

Returning again to the operation of the finder 200 and the primary selector 300 it will be recalled that when the party line subscriber at station 1A initiated the call, the finder 200 and the primary selector 300 cooperated to connect the calling subscriber station to the register translator 60X and to cause the operation therein of the line relays R1960X and R2000X. It will also be recalled that in response to the operation of the line relays R1960X and R2000X, the register control relay R350 operated thereby to connect the registers S2541X to S2544X to the common equipment 123 utilized in controlling the finder 200 to connect with the calling line and thus cause the calling subscriber line number to be transferred to the registers in the register translator 60X. As a further result of the operation of the line relay R1960X and R2000X, the usual dial tone signal is transmitted to the calling subscriber in the manner described and disclosed in the previously mentioned Ostline patent to indicate to the calling subscriber thereat that the calling device may now be actuated in accordance with the digits of the directory number of the desired called subscriber. The called subscriber directory number may include one or more digits designating the desired called exchange and a multi-digit number designating the line of the desired called subscriber in the called exchange.

As a further result of the operation of the line relay R1960X, at its contacts 1962, it completes an obvious circuit for operating the hold relay R345. The hold relay R345, upon operating, at its contacts 346, prepares a point in the circuit for connecting the four band pass filters 380B, 385B, 390B and 395B to the conductor C391X. This circuit, however, is interrupted by the operation of the relay R1960X, at its contacts 1963. As a further result of the operation of the hold relay R345, at its contacts 347, it applies ground potential to the conductor C1839X thereby to complete an operating circuit for the frequency connecting relay R400. This circuit may be traced from ground by way of the contacts 347, the conductor C1839X, the chain contacts 378, 373, 368 and 363 and the winding of the relay R400, to battery. The relay R400 operates over the above-traced circuit and, at its contacts 401, 402, 403 and 404 simultaneously connects the four oscillators 411 to 414, inclusive, to the conductor C393X thereby to simultaneously transmit the four separate frequencies generated by the four oscillators.

In the present example, the four frequencies are transmitted by way of the conductor C393X, the wiper 383X, the conductor C373X, the contacts 322X, the conductor C362X, the contacts 226 and 201, the top contacts of the group relay R295, the conductor C1206 of the party line 11, the impulsing contacts 60 of the dialing mechanism at the calling subscriber station 1A (assuming that the calling subscriber has not as yet actuated the calling device) and returning by way of the conductor C1207 of the party line 11, the next to the top contacts of the group relay R295, the contacts 202 and 227, the conductor C361X, the contacts 321X, the conductor C371X, the wiper 381X, the conductor C391X, the condenser 343 and to the armature spring of the contacts 1963. Since the line relay R1960X is in its operated position at the present time the four frequencies generated by the four oscillators 411 to 414, inclusive, cannot be extended by way of the contacts 1963 and 346 to the four band pass filters 380B to 395B, inclusive.

From the foregoing, it should be understood that in response to the operation of the line relay R1960X and the slow-to-release hold relay R345, the calling party station identifying signals are simultaneously transmitted by the four oscillators 411 to 414, inclusive, to the station of the calling party line subscriber. It should also be understood that the dial tone signal is transmitted to the calling subscriber to indicate that dialing may commence. The calling subscriber now actuates the calling device in accordance with the first digit of the directory number of the desired called subscriber. As soon as the dialing mechanism is released by the calling subscriber, it automatically returns to normal and upon this return movement of the dialing mechanism, the impulsing springs 60 are intermittently opened to transmit a number of pulses corresponding to the value of the digit dialed, in a conventional manner. In the present case, however, as soon as the impulsing contacts 60 of the dialing mechanism are opened, they remove the shunt circuit from the filter network 51 thereby to connect the filter network across the conductor C1206 and C1207 of the calling party line 11. In the register translator 60X the line relays R1960X and R2000X immediately restore to normal as soon as the impulsing contacts 60 are opened at the beginning of the first impulse. The line relay R1960X upon restoring, at its contacts 1962, opens a point in the circuit for the slow-to-release relay R345 but due to its slow-to-release characteristics the relay R345 does not restore to normal during the intermittent operation of the relay R1960X during impulsing. However, at the contacts 1963, the relay R1960X upon restoring, completes the previously described circuit for connecting the four band pass filters 380B to 395B, inclusive, to the conductor C391X. The band pass filters are now in condition to respond to the particular frequency which is passed by the filter network 51 provided at the calling subscriber station on the party line 11.

With the filter network 51 bridged across the line conductors C1206 and C1207, the filter network 51 only passes the frequency generated by the oscillator 411 which is assumed to be 9.35 kilocycles. When this frequency is returned to the register translator 60X over the conductor 391X it is received by the coils 380A, 385A, 390A and 395A and thus repeated to the four band pass filters 380B, 385B, 390B and 395B. The above four band pass filters are each tuned to pass one of the frequencies transmitted by the four oscillators 411 to 414, inclusive. Furthermore, the four band pass filters 380B to 395B correspond respectively to the four filter networks 51 to 54, inclusive, provided at the four party subscriber stations on the party line 11. More specifically, the band pass filter 380B corresponds to the filter networks 51 at the subscriber station 1A and it is also tuned to pass only the frequency generated by the oscillator 411 which is assumed to be 9.35 kilocycles. The band pass filter 385B corresponds to the filter network 52 and these two filters are tuned to pass only the frequency generated by the oscillator 412 which is assumed to be 12.55 kilocycles. The band pass filter 390B corresponds to the filter network 53 and these two networks are tuned to pass only the frequency generated by the oscillator 413 which is assumed to be 15.95 kilocycles. Finally, the band pass filter 395B corresponds to the filter network 54 and these networks are tuned to pass only the frequency generated by the oscillator 414 which is assumed to be 20.85 kilocycles.

In view of the foregoing it will be understood that the frequency generated by the oscillator 411 is transmitted through the filter network 51 at the calling subscriber station 1A and is repeated by the repeater 380A, and passed by the band pass filter 380B to the repeating coil 380C. The repeating coil 380C repeats the signal to the amplifier 380D which, in turn, completes an operating circuit for the register relay R360. Upon operating, the relay R360, completes an obvious locking circuit for itself including its contacts 361 and the grounded conductor C1839X. Also upon operating, at its contacts 363, the relay R360 opens a point in the previously described chain circuit thereby to cause the frequency connect relay R400 to be restored to normal. The relay R400, upon restoring to normal, at its contacts 401 to 404, inclusive, now disconnects the four frequencies generated by the oscillator 411 to 414, inclusive, from the conductor C393X and consequently from the conductors of the calling subscriber party line 11. At the end of the first impulse, the impulsing springs 60 at the calling subscriber station are again closed thereby to recomplete the previously described loop circuit for operating the line relays R1960X and R2000X. Upon reoperating, the relay R1960X, at its contacts 1962 again recompletes the circuit for the hold relay R345 which has been maintained in its operated position due to its slow-to-release characteristics during the first impulse. At its contacts 1963, the relay R1960X again interrupts the point in the previously described circuit for controlling the band pass filters in the register translator 60X in accordance with the particular calling subscriber station on the calling party line 11. The remaining impulses are transmitted by the impulsing springs 60 at the calling subscriber station in accordance with the value of the digit dialed. The line relays R1960X and R2000X are controlled in the manner described in the previously mentioned Ostline patent to register the impulses of the first digit and also to register all of the remaining digits of the called subscriber directory number. Particular attention is directed to the fact that the relay R400 is released to disconnect the frequencies generated by the oscillators from the calling subscriber line as soon as any one of the register relays R360, R365, R370 or R375 is operated.

Thus, it will be seen that the filter network 51 at the calling subscriber station is effective to block three of the frequencies and to pass one of the frequencies transmitted by the oscillators in response to the first interruption of the calling line loop circuit by the impulsing springs 60 and that the registration of the identity of the particular calling station on the calling party line is accomplished before the impulsing springs 60 are again closed at the termination of the first impulse transmitted by the calling subscriber dial.

Referring again to the operation of the register relay R360, it is noted that, at its contacts 361 and 362, it connects the grounded conductor C1839X to the W and X conductors in the cable 2453X thereby to mark the digit "1" corresponding to the identity of the first subscriber station 1A on the party line 11 in the banks of the storage transfer switch U2500X (not shown) in the register translator 60X. Accordingly, the WXYZ conductors in the cables 2561X to 2564X and the cable 2453X are now marked in accordance with the four digits of the numerical portion of the directory number of the calling party line 11 and the one digit corresponding to the particular calling subscriber station on the party line 11. The manner in which this information is subsequently transferred by the storage transfer switch U2500X for subsequent recording upon an individual ticket produced upon the termination of the connection is described in detail in the previously mentioned Ostline patent. It should also be understood that the manner in which various digits corresponding to the directory number of the called subscriber line are registered in the register translator 60X and are subsequently utilized in the setting up of the connection to the desired called subscriber station is also described in detail in the above-mentioned Ostline patent.

As soon as the connection is completed to the desired called subscriber, the register translator 60X is automatically released from the connection whereupon the various relays therein are restored to normal. It should be noted that as soon as the line relay R1960X restores to normal, it interrupts the circuit for the hold relay R345 which slowly restores to normal. As soon as the relay R345 restores, it interrupts its contacts 347 thereby to remove the holding ground potential from the conductor C1839X. As soon as the ground potential is removed from the conductor C1839X, any one of the operated register relays R360, R365, R370 or R375 is restored to normal; the relay R340 is restored to normal and any one or more of the operated storage relays in the registers S2541X to S2544X is also restored to normal. When these operations have been completed, the register translator 60X is again rendered available for use in completing another telephone connection.

During the time that the calling subscriber at station 1A is conversing with the called subscriber, a ground potential is maintained on the conductor C363X in order to retain the unit relay R200 and the group relay R295 in the finder 200 in their operated position; to retain the lock-out relay R100 and the cut-off relay R105 in the line circuit 11' in their operated positions; and finally, to mark the calling subscriber party line busy in the banks of the various connectors having access thereto. When the connection is terminated by the subscribers, the above-mentioned holding ground potential is removed from the conductor C363X thereby to cause the above-mentioned relays to restore to normal and to remove the busy marking ground potential from the calling subscriber party line 11. As soon as the above-mentioned relays restore to normal, the line circuit 11' and the finder 200 are again rendered available for an additional call. It may be well to mention at this time that the primary selector 300 also restores to normal at the time the ground potential is removed from the conductor C363X in the well-known manner. However, in order to obtain a complete description of the manner in which the primary selector 300 is both operated during the establishment of a connection and released at the termination of the connection, reference may be had to the previously mentioned Ostline patent.

From the foregoing description of the operation of the apparatus disclosed in Figs. 1 to 3, inclusive, it should be understood each time a call is initiated by a party line subscriber on the party line 11, the numerical portion of the directory number of the party line 11 will be registered in a register translator, such as the register translator 60X, and also the digit corresponding to the number of the calling station on the calling party line 11 will be registered in the register relays, such as the relays R360, R365, R370 and R375 in a register translator, such as the register translator 60X, utilized in establishing the desired connection.

A description will now be given of the manner which the apparatus functions to register the numerical portion of the directory number of a calling individual subscriber line. When the individual line subscriber at substation 2 removes the receiver from the telephone instrument thereat to initiate a call, a loop circuit is completed including the line conductors C1203 and C1204 of the individual line 20, and the upper and lower winding of the line relay R125 in the line circuit 20'. The relay R125 operates over this circuit and, at its contacts 127, completes a circuit from ground by way of the contacts 118, the lower winding of the relay R140 (assuming that the common equipment 123 is idle) the contacts 145, 163, 153, 143, and 133, and the resister 167, to battery. The relay R140 operates over this circuit and, at its contacts 144, locks itself in its operated position over a circuit which is independent of a portion of the chain circuit including chain contacts on the tens group auxiliary relays and, at its contacts 143 and 145, it interrupts further points in the chain circuit to prevent operation of any other tens group auxiliary relay. At its contacts 142, the relay R140, upon operating completes a circuit for operating a unit relay corresponding to the units digit of the calling subscriber directory number. The last-mentioned circuit may be traced from ground by way of the upper winding of the subgroup auxiliary relay R170, the contacts 128, 119 and 142, the lower winding of the units group auxiliary relay R280, the contacts 286, 284, 274, 264, 254 and 244, and the resistor 289, to battery.

The relay R280, upon operating, at its contacts 285, completes a locking circuit for itself which is independent of a portion of the above-mentioned chain circuit and at its contacts 284 and 286, it interrupts further points in the operating chain circuit thereby to prevent operation of any of the remaining units group auxiliary relays.

Assuming now that the distributor 600 has assigned the finder 200 for use in this call, at its contacts 282, the relay R280 completes an operating circuit for the control relay R230 which relay upon operating prepares circuits for operating certain group relays, unit relays and the even subgroup relay included in the finder 200.

Since the tens group auxiliary relay R140 is now in its operated position, it completes a circuit, at its contacts 141, for operating the group relay R290 in the finder 200 as soon as the contacts 231′ are closed in response to the above-described operation of the control relay R230. Since the units group auxiliary relay R280 is operated at this time, at its contacts 281, it completes a circuit for operating the units relay R220 in the finder 200 as soon as the contacts 233″ are closed by the operation of relay R230.

When the common subgroup auxiliary relay R170 operated in the manner described above, at its contacts 173, it completes a multiple locking circuit including its lower winding and, at its contacts 172, it completes an obvious circuit for operating the even relay R235 in the common equipment 123. Also as soon as the relay R230 closes its contacts 233A the relay R170, at its contacts 172, also completes an obvious circuit for operating the even subgroup relay R225 in the finder 200. When the above-described operations have been completed, the distributor 600 is controlled in the manner pointed out previously to assign another finder for the next call.

Referring now to the finder 200 it is noted that at the present time the group relay R290, the unit relay R220, and the even subgroup relay R225 are in their operated positions. The relay R290 upon operating at the various contacts shown above the relay, selectively connects the finder to a group of ten subscriber lines including the calling subscriber line 20. The unit relay R220, upon operating, at its contacts 221 to 223, inclusive, and 221′ to 223′, inclusive, selects two subscriber lines in the group of lines including the calling line 20. Finally, the even subgroup relay R225, upon operating, at its contacts 226′ to 228′, inclusive, selects the particular calling subscriber line 20 in the selected group of lines. When the above relays are in the operated positions noted above, the calling subscriber loop circuit including the conductors C1203 and C1204 are now extended through contacts of the operated relays in the finder 200 to the conductors C361X and C362X to the primary selector 300, at which time, the line relay R420X in the primary selector 300 is operated. The circuit for operating the relay R420X may be traced from battery by way of the winding of the relay R420X, the contacts 313X, the conductor C361X, the contacts 227′, 222′, the contacts of the operated group relay R290, the conductor C1204 extending to the calling subscriber substation 2 and returning by way of the conductor C1203, the contacts on the operated group relay R290, the contacts 221′ and 226′, the conductor C362X, and the contacts 315X, to ground. The relay R420X operates over the above-traced circuit thereby to cause operations to be performed in the primary selector 300 whereby the contacts 331X are closed to extend ground potential by way of the contacts 317X to the conductor C363X, and whereby the register translator selector 380X is controlled to find an idle register translator. The application of ground potential to the conductor C363X provides locking circuits for various operated relays. Accordingly, the even subgroup relay R225, at its contacts 229, and the unit relay R220, at its contacts 224, locks to the conductor C363X, and the group relay R290 locks itself to the conductor C363X by way of the contacts immediately above the relay R290. Also the even relay R235 is locked to the grounded conductor C363X over the circuit including the contacts 233A and 229. In addition to the foregoing, the ground potential applied to the conductor C363X is extended by way of the contacts 228′ and 223′ and the contacts of the operated group relay R290 to the conductor C1205 terminating in the line circuit 20′. One branch of the circuit including the grounded conductor C1205 extends to the connector bank contacts having access to the calling subscriber line thereby to mark the line busy to all connectors having access thereto. The other branch of the circuit including the grounded conductor C1205 extends by way of the winding of the cut-off relay R120 and the winding of the lock-out relay R115 to battery thereby to cause the operation of said relays.

When the cut-off relay R120 operates, it disconnects the line relay R125 from the calling subscriber line conductors C1203 and C1204, at its contacts 121 and 122. The line relay R125 now restores to normal and, at its contacts 127 and 128, interrupts the initial operating circuits for the relays R140, R170 and R280. The subgroup auxiliary relay R170 now restores to normal. The relays R140 and R280, however, are locked in their operated positions by way of their upper windings, the respective contacts 148 and 283, and the grounded chain conductor C357.

When the lock-out relay R115 operates in the manner described above, it interrupts, at its contacts 118 and 119, further points in the initial operating circuits which were opened by the restoration of the line relay R125 as described above.

When the register translator selector 380X connects an idle register translator, such as the register translator 60X to the primary selector 300, the relays R310X and R320X in the primary selector are operated and the relays R1960X, R1930X and R2000X in the register translator 60X are also operated, all in the manner described in the previously mentioned Ostline patent. The relay R1930X provides the locking ground potential for the conductor C363X and the relays R1960X and R2000X are operated over the loop circuit including the calling subscriber line 20. Upon operating, the relay R1960X, at its contacts 1962, completes an operating circuit for the hold relay R345, which relay upon operating, at its contacts 347, applies ground potential to the conductor C1939X. As a further result of the operation of the relay R1960X, at its contacts 1961, it completes a circuit including the winding of the register control relay R350, the contacts 341 and the resistor 343′ whereby the relay R350 operates in the manner previously described to connect the WXYZ storage relays of each of the four registers S2541X to S2544X, inclusive, to the respective thousands, hundreds, tens and units marking cables 390 to 393, inclusive.

Referring now to the contacts 234A to 234D, inclusive, of the operated control relay R230 in the finder 200, it will be noted that the WXYZ conductors in the thousands and hundreds marking cables 390 and 391 are permanently wired at the terminal block TB298 to register the thousands digit "2" corresponding to the thousands digit of the numerical portion of the calling subscriber directory number in the thousands register S2541X in accordance with the code table described above. The hundreds digit "2" corresponding to the hundreds digit of the numerical portion of the directory number of the calling subscriber line is marked on the WXYZ conductors with the marking cable 391 thereby to cause the hundreds register S2542X to register the digit "2." Since the tens group auxiliary relay R140 is retained in its operated position, at its contacts 146 and 147, it now applied ground potential to the W and Y conductors in the tens marking cable 392 thereby to register the digit "2" in the tens register S2543X. Finally, the unit group auxiliary relay R280, which is also retained in its operated position, at its contacts 288, applies ground potential by way of the contacts 239 of the operated even relay R235 to the Z conductor in the units marking cable 393 thereby to register the tens digit "0" in the units register S2544X. In this manner the operated tens group auxiliary relay, the operated units group auxiliary relay, the operated even relay R235 in the common equipment 123 and the control relay R239 in the finder 200 control the registers S2541X to S2544X, inclusive, in the register translator 60X to register the digits of the numerical portion of the directory number "2220" of the calling individual subscriber station 2.

As a further result of the above-described operation of relay R350, at its contacts 351, it removes the locking ground potential from the chain conductor C357 thereby to cause the operated relays R280 and R140 to be restored to normal and thus renders the common equipment 123 available for an additional call. Incident to the restoration of the relay R280, at its contacts 282, it interrupts the circuit of the control relay R230 which now restores to normal and thereby disconnects the various operating circuits for the relays in the finder 200 from the associated common equipment 123.

Referring again to the relay R350, it is noted that at its contacts 352, it also completes an obvious circuit for operating the relay R340, which relay locks itself in its operated position over a circuit including its lower winding, the contacts 342 and the grounded conductor C1839X. As a further result of the operation of relay R340, at its contacts 341, it interrupts the circuit of the relay R350 which slowly restores to its normal unoperated position. The restoration of the relay R350, disconnects the various marking conductors from the registers S2541X to S2544X, inclusive, and prepares the chain circuit including the conductor C357 for additional calls. It should be understood at this time that the various operated storage relays in the registers S2541X to S2544X, inclusive, are locked in their operated positions to the grounded conductor C1839X.

As a further result of the previously described operation of the line relay R1960X, at its contacts 1963, it opens a point in the circuit over which the calling station identifying frequency is received for the purpose of controlling the station identifying register relays R360, R365, R370 and R375. Consequently, when the hold relay R345 is operated, as previously noted, the ground potential applied to the conductor C1839X is extended over the previously described chain circuit including the contacts 378, 373, 368 and 363 in order to operate the frequency connect relay R400. The operation of the relay R400 connects the four oscillators 411 to 414, inclusive, to the conductor C393X thereby to transmit over one conductor of the calling subscriber line the four frequencies corresponding to the four different stations on the calling party line. Inasmuch as the finder 200 also has access to subscriber lines of the individual type having only one subscriber station thereon, it will be noted that the four frequencies are also transmitted over the line conductors of calling individual subscriber lines. Since the line relay R1960X is in its operated position, it prevents the completion, at this time, of the circuit for controlling the band pass filters corresponding to the various station identifying frequencies.

As a further result of the operation of the line relay R1960X at the time the register translator 60X is seized, a dial tone signal is transmitted to the calling subscriber at station 2, in the manner described in the previously mentioned Ostline patent. The calling subscriber at station 2 now actuates the calling device thereat, in the manner previously described, thereby to open a point in the loop circuit including the winding of the line relay R1960X. The line relay R1960X restores at the beginning of the first pulse of the first digit transmitted by the calling device and closes its contacts 1963 in order to prepare a point in the circuit, including the conductor C391X which is utilized to control the band pass filters in the register translator 60X. However, since the individual calling subscriber station 2 is not provided with a filter network, the opening of the impulsing springs by the dialing mechanism thereat, at the beginning of the first impulse interrupts the loop circuit including the line conductors C1203 and C1204 and thus interrupts another point in the circuit path including the conductor C391X over which the station identifying signal frequencies are transmitted to the band pass filters in the register translator 60X.

At the end of the first impulse of the first digit to be transmitted by the calling device at station 2, the impulsing springs thereat are again closed to terminate the first impulse, whereupon the calling subscriber line loop circuit is again completed to reoperate the relay R1960X.

The line relay R1960X does not operate the instant the impulsing springs are closed and, in addition thereto, the contacts 1963 do not open until the relay R1960X is completely operated. During the interval that the impulsing springs at the calling station are closed and the contacts 1963 are also closed, the four station identifying frequencies are transmitted to the four band pass filters in the register translator 60X. During this interval, the four frequencies generated by the oscillators 411 to 414, inclusive, will be transmitted over the circuit including the condenser 344, the conductor C393X, the wiper 383X, the conductor C373X, the contacts 322X, the conductor C362X, the contacts 226' and 221', the contacts of the operated group relay R290, the conductor C1203 of the calling line 20, the impulsing springs (not shown) of the calling device at the calling individual line subscriber station 2, the conductor C1204, the contacts of the operated group relay R290, the contacts 222′ and 227′, the conductor C361X, the contacts 321X, the conductor C371X, the wiper 381X, the conductor C391X, the condenser 343, the contacts 1963 (which remain closed for a short interval before the line relay R1960X reoperates), the contacts 346, and to each of the repeating coils 380A, 385A, 390A and 395A individually associated with the respective band pass filters 380B, 385B, 390B and 395B. The band pass filters noted above are tuned to pass respectively the frequencies generated by the four oscillators 411 to 414, inclusive, thereby to operate the four register relays R360, R365, R370 and R375 in the manner previously described. At this time each of the above-enumerated register relays is operated and locked in its operated position to the grounded conductor C1839X. In response to the operation of each of the register relays R360, R365, R370 and R375, a chain circuit including the contacts 364, 369, 374 and 379 is completed for operating the individual subscriber relay R398. This relay, upon operating, interrupts the circuits of the WXYZ marking conductors in the cable 2453X thereby to prevent the markings on each of the conductors from being extended to the storage transfer switch U2500X (not shown).

As soon as the register relays noted above are operated, the previously described circuit for controlling the frequency connected relay R400 is interrupted thereby to terminate the transmission of the four station identifying signals.

In view of the foregoing description of the mode of operation of the disclosed apparatus to prevent the marking of the WXYZ conductors in the cable 2453X when a call is initiated by an individual subscriber, it will be understood that the time cycle including the closing and opening of the impulsing springs at the calling subscriber station on an individual line and the opening and closing, of the contacts 1963 of the line relay R1960X is slightly out of phase so that the respective contacts are closed during a short interval in the cycle in order to permit the four band pass filters to respond to the four frequencies simultaneously transmitted over the calling subscriber line and operate the four station identifying registers R360 to R375, inclusive. The operation of the four register relays will, in turn, operate the relay R398 to disconnect the marking conductors in the cable 2453X from the register relays noted and prevent the marking of a station identification whenever a call is made from an individual subscriber station.

The remaining operations of the equipment in response to the dialing of the directory number of the called subscriber station, the registering of these digits in the register translator 60X, the setting up of the connection under control of the register translator 60X, the transmission of the various items of information for recording purposes, the release of the register translator 60X from the connection, and the release of the telephone connection at the termination thereof is the same as described in the previously mentioned Ostline patent.

While the arrangement for identifying the various subscriber stations on a calling party line has been illustrated with four stations per line, it should be understood that any number of stations may be provided on each party line and the identification thereof may be made by increasing the number of oscillators, and also providing a corresponding number of band pass filters and register relays which will respond to a corresponding number of frequencies.

While one embodiment of the invention has been described, it will be understood that various modifications may be made therein without departing from the true spirit and scope of the invention.

I claim:

1. In a telephone system, a line having an individual line number, a switch, group and unit marking relays, means operated responsive to the initiation of a call on said line for selectively operating said group and unit marking relays in accordance with the number of said line, a register, means governed in accordance with the selective operation of said group and unit marking relays for directively operating said switch to connect said line to said register, and means in said register selectively controlled by said operated group and unit marking relays for registering said line number.

2. In a telephone system, a line having an individual line number, a finder, group and unit marking relays, means operated responsive to the initiation of a call on said line for selectively operating said group and unit marking relays in accordance with the number of said line, means governed in accordance with the selective operation of said group and unit marking relays for operating said finder to select said line, a register, means operated responsive to said selection of said line for associating said register with said finder, means operated responsive to the association of said register with said finder for associating said register with said group and unit marking relays, and means in said register selectively operated in accordance with said selective operation of said operated group and unit marking relays for registering the line number individual to said line.

3. In a telephone system, a line having an individual line number, a finder, group and unit marking relays, means operated responsive to the initiation of a call on said line for selectively operating said group and unit marking relays in accordance with the number of said line, means governed in accordance with the selective operation of said group and unit marking relays for operating said finder to select said line, a register, means operated responsive to said selection of said line for associating said register with said line, means in said register operated in response to said association for connecting said group and unit marking relays and said register, and means in said register selectively controlled by said operated group and unit marking relays for registering the line number individual to said calling line.

4. In a telephone system a line having an individual line number, a finder, group and unit marking relays, means operated responsive to the initiation of a call on said line for selectively operating said group and unit marking relays in accordance with the number of said line, means governed in accordance with the selective operation of said group and unit marking relays for operating said finder to connect with said line, a register, means operated responsive to said connection for automatically associating said register with said line, connecting means operated responsive to the association of said register with said calling line for associating said register with said group and unit marking relays, means in said register selectively operated thereafter in accordance with said selective operation of said operated group and unit marking relays for registering the line number individual to said line, and means operated responsive to said operation of said connecting means for disconnecting said group and unit marking relays from said register and from said finder.

5. In a telephone system, a line having an individual line number, a finder, a control unit, a plurality of registers, a locking circuit for said control unit including each of said registers, means operated responsive to a call on said line for selectively operating said control unit in accordance with the number of said line and for locking said operated control unit to said locking circuit, means governed in accordance with said selective operation of said control unit for operating said finder to connect with said calling line, means operated responsive to said connection for selecting an idle one of said registers and for connecting said selected register to said calling line, connecting means operated responsive to the connection of said register to said calling line for momentarily connecting said control unit to said register, means in said register selectively controlled by said control unit responsive to said momentary connection for registering the line number individual to said calling line, and means also controlled by said connecting means for momentarily interrupting said locking circuit in order to disconnect said control unit from said finder.

6. In a telephone system, a group of lines, each of said lines having an individual multi-digit identification, a finder switch having access to said lines, a group relay operated responsive to the initiation of a call on any one of said lines for registering the identification of the group of lines including said calling line, a unit relay also operated responsive to the initiation of said call on said one line for registering the identification of said one calling line in said group of lines, means controlled by the operation of said group relay and said unit relay for directively operating said finder switch to connect with said calling line, and additional means controlled by said group relay and said unit relay for registering digits corresponding to the multi-digit identification of said calling line.

7. In a telephone system, a group of lines, each of said lines being identified by a plural digit number, a finder switch having access to said lines, a group marker operated responsive to the initiation of a call on any one of said lines for identifying said group of lines, a unit marker also operated responsive to the initiation of said call on said one line for identifying said one calling line in said group of lines, means controlled by said group marker and said unit marker for directively operating said finder switch to connect with said calling line, a register, means in said finder for operating said register to register a predetermined number of said digits identifying said calling line, means also controlled by said group marker and said unit marker for operating said register to register the remaining number of said digits identifying said calling line.

8. In a telephone system, a group of lines each of said lines having a group designating digit and a line designating digit, a finder switch having access to said lines, a group relay operated responsive to the initiation of a call on any one of said lines for identifying said group of lines, a unit relay also responsive to the initiation of said call on said one line for identifying said one calling line in said group of lines, means jointly controlled by said group relay and said unit relay for directively operating said finder switch to select said calling line, a register translator, means operated responsive to said selection of said calling line for associating said register translator with said calling line, means in said register translator operated in accordance with the operation of said group relay for registering said digit designating said group of lines, and means in said register translator operated in accordance with the operation of said unit relay for registering said digit designating said one calling line in said identified group of lines.

9. In a telephone system, a group of lines, each of said lines having a group identification and an individual identification, a finder switch having access to said lines, equipment common to said lines, a first group and a second group of marking conductors, first means operated responsive to the initiation of a call on one of said lines for selectively operating said common equipment to mark said first group and said second group of marking conductors in accordance with the group identification of said calling line, second means also responsive to the initiation of said call on said one calling line for selectively operating said common equipment to mark said first group and said second group of marking conductors in accordance with the individual identification of said calling line, means in said finder controlled in accordance with said markings on said first group of marking conductors for directively operating said finder switch to connect with said calling line, a register translator, means operated responsive to the connection of said finder switch with said calling line for associating said register translator with said common equipment, and means in said register translator directively controlled in accordance with said markings on said second group of marking conductors for registering said group identification and said individual identification of said calling line.

10. In a telephone system, a plurality of groups of lines, each of said lines having individual line numbers, a group of finders having access to said groups of lines and operative to select a line therefrom, control equipment common to said lines and to said finders comprising a plurality of group relays each corresponding to a different group of lines and a plurality of unit relays each corresponding to a line in each of said groups of lines, means operated responsive to the initiation of a call on a line in one of said groups for selectively operating one of said group relays and one of said unit relays in said control equipment, means controlled responsive to said selective operation of said control equipment for selecting an idle one of said finders in said group of finders and for controlling said selected finder to select said calling line in accordance with said operated group relay and said operated unit relay, and means controlled by said operated group relay and said operated unit relay for registering the line number of said calling line.

11. In a telephone system, a plurality of groups of lines, each of said lines having individual line numbers, a group of finders having access to said groups of lines and operative to select a calling one of said lines, control equipment common to said lines and to said finders comprising a plurality of group relays corresponding in number to the number of groups of lines and a plurality of unit relays each corresponding to a line in each of said groups of lines and a subgroup relay, means operated responsive to the initiation of a call on a line in one of said groups for selectively operating the group relay corresponding to the group of lines including said calling line and the unit relay corresponding to said calling line and said subgroup relay in said control equipment, means controlled responsive to said selective operation of said control equipment for selecting an idle one of said finders in said group of finders and for controlling said selected finder to select said calling line in accordance with said operated group relay and said operated unit relay and said operated subgroup relay in said control equipment, means controlled by said operated group relay and jointly controlled by said operated unit relay and said operated subgroup relay for registering the individual line number of said calling line.

12. In a telephone system, a plurality of groups of lines, each of said lines having individual line numbers, each of said groups of lines being divided into two subgroups, a group of finders having access to said groups of lines and operative to select a line therefrom, control equipment common to said lines and to said finders comprising a plurality of group relays each corresponding to a different group of lines and a plurality of unit relays each corresponding to two subgroups in each of said groups of lines and a subgroup relay, means operated responsive to the initiation of a call on a line in one of said subgroups for selectively operating one of said group relays and one of said unit relays and said subgroup relay in said control equipment, means operated responsive to the initiation of a call on a line in the other of said subgroups for selectively operating one of said group relays and one of said unit relays without operating said subgroup relay in said control equipment, means controlled responsive to the selective operation of said control equipment for selecting an idle one of said finders in said group of finders and for controlling said selected finder to select said calling line in accordance with the operated group relay and the operated unit relay and the operated or nonoperated subgroup relay in said control equipment and means controlled by said operated group relay and jointly controlled either by said operated unit relay and said operated subgroup relay or by said operated unit relay and said non-operated subgroup relay depending upon the subgroup of lines including said calling line for registering the line number of said calling line.

13. In a telephone system, a party line having an individual line number, a plurality of stations on said party line, each of said stations having an individual station number, a finder, a control unit, means operated responsive to the initiation of a call at one of said stations on said line for selectively operating said control unit in accordance with the number of said calling line, means governed in accordance with the selective operation of said control unit for operating said finder to connect with said calling line, a register, means operated responsive to said connection for associating said register with said calling and with said control unit line, means in said register selectively controlled by said control unit for registering said line number, frequency generators included in said register corresponding to said individual station numbers, and means at said calling station on said calling party line for selectively connecting one of said frequency generators to said register to register said individual station number corresponding to said calling station on said calling party line.

14. In a telephone system, a party line having an individual line number, a plurality of stations on said party line, each of said stations having an individual station number, a finder, a control unit, means operated responsive to the initiation of a call at one of said stations on said line for selectively operating said control unit in accordance with said calling line number, means governed in accordance with the selective operation of said control unit for operating said finder to connect with said calling line, a register, means operated responsive to said connection for associating said register with said calling line, means in said register selectively controlled by said control unit for registering said line number, means in said register for transmitting a different station identifying signal corresponding to the different stations on said calling line, means at said calling station on said calling line for blocking said station identifying signals corresponding to the remaining stations on said line and for passing the said station identifying signal corresponding to said calling station, and means in said register controlled by said station identifying signal passed at said calling station for registering the station number corresponding to said calling station on said line.

15. In a telephone system, a party line, an individual line, each of said lines having an individual line number, a plurality of stations on said party line, each of said party line stations having an individual station number, a station on said individual line, a finder, a control unit, means operated responsive to the initiation of a call at any one of said stations for selectively operating said control unit in accordance with the number of the line of said calling station, means governed in accordance with said selective operation of said control unit for operating said finder to select said calling line, a register, means operated responsive to said selection for associating said register with said calling line and with said control unit, means in said register selectively controlled by said control unit for registering the line number of said calling line, a plurality of station identifying signal transmitting means, a plurality of station identifying signal receiving means, each of said transmitting means and each of said receiving means corresponding individually to one of said stations on said party line, means also operated in response to said selection of said calling line for connecting all of said transmitting means to said calling line in order to transmit all of said identifying signals thereto, means at said calling station in the event it is on said individual line controllable by the subscriber thereat for connecting all of said signals to said receiving means in order to operate all of said receiving means, means at a calling station in the event it is on said party line controllable by the subscriber thereat for connecting only the signal corresponding to said calling station to said receiving means in order to operate the one of said receiving means corresponding to said calling station on said party line, marking conductors, means controlled in response to the operation of one of said receiving means for marking said marking conductors in accordance with the number of said calling station on said party line, and means controlled responsive to the operation of all of said receiving means for preventing the marking of said marking conductors.

16. In a telephone system, a party line, an individual line, each of said lines having an individual line number, a plurality of stations on said party line, each of said party line stations having an individual station number, a station on said individual line, a finder, a control unit, means operated responsive to the initiation of a call at any one of said stations for selectively operating said control unit in accordance with the number of the line of said calling station, means governed in accordance with said selective operation of said control unit for operating said finder to select said calling line, a register, means operated responsive to said selection for associating said register with said calling line and with said control unit, means in said register selectively controlled by said control unit for registering the line number of said calling line, a plurality of station identifying signal transmitting means, a plurality of station identifying signal receiving means, each of said transmitting means and each of said receiving means corresponding individually to one of said stations on said party line, means also operated in response to said selection of said calling line for connecting all of said transmitting means to said calling line in order to transmit all of said identifying signals thereto, means at said calling station in the event it is on said individual line controllable by the subscriber thereat for connecting all of said signals to said receiving means in order to operate all of said receiving means, means at a calling station in the event it is on said party line controllable by the subscriber thereat for connecting only the signal corresponding to said calling station to said receiving means in order to operate the one of said receiving means corresponding to said calling station on said party line, marking conductors, means controlled in response to the operation of one of said receiving means for marking said marking conductors in accordance with the number of said calling sation on said party line, means controlled responsive to the operation of all of said receiving means for preventing the marking of said marking conductors by any of said operated receiving means, and means controlled responsive to the operation of at least one of said receiving means for disconnecting all of said transmitting means from said calling line.

17. In a telephone system, a party line, a plurality of stations on said line, each of said stations having an individual station symbol, an individual line, a station on said individual line, switching apparatus, a register mechanism, means responsive to the initiation of a call on one of said lines for controlling said switching apparatus to extend a connection from said one calling line to said register mechanism, a plurality of generators in said register mechanism for transmitting signals individual to each of said stations on said party line, a filter at each of said stations on said party line tuned to pass only the station signal individual thereto, means responsive to the connection of said calling line to said register mechanism for controlling said generators to transmit said station signals to said calling line, signal responsive means in said register mechanism, means controllable at said calling station in the event it is on said party line for connecting the filter thereat to said calling line in order to pass only the station signal individual thereto to said signal responsive means and controllable at said calling station in the event it is on said individual line for passing all of said station signals to said signal responsive means, marking conductors, said signal responsive means being operative to mark said marking conductors in accordance with the station symbol corresponding to the received station signal, and means controlled in the event said signal responsive means is operated by all of said station signals for preventing the marking of said marking conductors.

18. In a telephone system, a party line, a plurality of stations on said party line, each of said stations having an individual station identifying symbol, switching apparatus, a register mechanism, means responsive to the initiation of a call at one of said stations on said line for controlling said switching apparatus to extend a connection from said calling line to said register mechanism, a plurality of generators in said register mechanism for transmitting signals identifying each of said stations, a filter at each of said stations, means responsive to said connection for controlling said generators to transmit said station identifying signals to said calling line, means including the filter at said calling station on said calling line for passing only said calling station identifying signal, and signal responsive means in said register mechanism selectively operated in accordance with the station identifying signal passed at said calling station filter for registering the symbol individual to said calling station on said calling party line.

19. In a telephone system, a party line, a plurality of stations on said party line, each of said stations having an individual station identifying symbol, switching apparatus, a register mechanism, means responsive to the initiation of a call at one of said stations on said line for controlling said switching apparatus to extend a connection from said calling line to said register mechanism, a plurality of generators in said register mechanism for transmitting signals identifying each of said stations, a filter at each of said stations, generator connecting means operated responsive to said connection for connecting said generators to said calling line in order to transmit thereto said station identifying signals, means including said calling station filter for passing only said calling station identifying signal, and signal responsive means selectively operated in accordance with said calling station identifying signal passed by said calling station filter for registering the symbol identifying said calling station on said calling party line.

20. In a telephone system, a party line, a plurality of stations on said party line, each of said stations having an individual station identifying symbol, switching apparatus, a register mechanism, means responsive to the initiation of a call at one of said stations on said line for controlling said switching apparatus to extend a connection from said calling line to said register mechanism, a plurality of generators in said register mechanism for transmitting signals identifying each of said stations, a filter at each of said stations, generator connecting means operated responsive to said connection for connecting said generators to said calling line in order to transmit thereto said station identifying signals, means including said calling station filter for passing only said calling station identifying signal, signal responsive means selectively operated in accordance with said calling station identifying signal passed by said calling station filter for registering the symbol identifying said calling station on said calling party line, and means controlled responsive to said selective operation of said signal responsive means for controlling said generator connecting means to disconnect said generators from said calling line.

21. In an automatic telephone system, a party line, a plurality of stations on said party line, switching apparatus, means responsive to the initiation of a call on said line for extending a connection therefrom to said switching apparatus, means in said switching apparatus operated responsive to said connection for transmitting a number of station identifying signals over said line, each of said signals identifying a different station on said party line, discriminating means at each of said stations for passing the one of said station signals corresponding to the associated station and for blocking the station signals corresponding to the remaining stations on said party line, means at said calling station for rendering the associated discriminating means effective to pass said identifying signal corresponding to said calling station and to block said remaining station identifying signals and means in said switching apparatus operated in accordance with said calling station identifying signal passed by said discriminating means for registering the identity of said calling station on said calling party line.

22. In a telephone system, a party line, a number of stations on said line, switching apparatus, a register mechanism, means responsive to the initiation of a call on said line for controlling said switching apparatus to extend a connection from said calling line to said register mechanism, a plurality of generators in said register mechanism corresponding in number to the number of stations on said party line for transmitting a like number of station identifying signals, a filter network at each of said stations on said line, means responsive to said connection for controlling said generators to transmit said station identifying signals to said calling line, means including the filter network at the calling one of said stations on said calling line for passing only the station signal corresponding to said one calling station, and station signal responsive means in said register mechanism selectively operated in accordance with the station signal passed by said calling station filter network for registering the identity of said one calling station on said calling party line.

23. In a telephone system, a two-conductor party line, a plurality of stations on said party line, switching apparatus, a register mechanism, means operated responsive to the initiation of a call at one of said stations on said line for controlling said switching apparatus to extend a connection from said calling line to said register mechanism, a plurality of frequency generators in said register mechanism, each of said frequency generators corresponding to a different station on said party line, means responsive to the connection of said calling line to said register mechanism for controlling said generators to transmit said frequencies over one of said line conductors, means at said calling station for passing to said other conductor of said calling line the frequency corresponding to said calling station and for blocking therefrom the remaining frequencies corresponding to the remaining stations on said calling line, and means in said register mechanism controlled by the frequency passed to said other conductor for registering the identity of said calling station on said calling party line.

24. In a telephone system, a line having a plurality of subscribed stations, a filter network at each station, each of said networks being tuned to pass a different frequency, a dial at each of said stations having impulsing contacts adapted to transmit impulses to set up a telephone connection, said contacts normally rendering its associated filter network ineffective, a register, switching apparatus, means operated in response to the initiation of a call at one of said stations for controlling said switching apparatus to complete a connection from said calling station to said register, means in said register mechanism operated in response to said connection for transmitting to said line different frequencies corresponding to the different stations thereon, receiving means in said register adapted to be controlled by said different frequencies to register the identity of different stations on said line, means in said register controlled by said calling station impulsing contacts at the beginning of the first impulse transmitted by the associated dial for rendering the associated filter effective and for connecting said receiving means to said line, and means in said receiving means operated in accordance with the frequency passed by the filter network at said calling station for registering the identity thereof.

25. In a telephone system, a two-conductor party line, a plurality of stations on said party line, each of said stations having an individual station identifying symbol, switching apparatus, a register mechanism, a line relay and a hold relay in said register mechanism, means operated responsive to the initiation of a call on said line for controlling said switching apparatus to complete a connection from said calling line to said register mechanism in order to operate said line relay and said hold relay, a plurality of generators in said register mechanism for transmitting signals identifying each of said stations, means controlled in response to the operation of said hold relay for transmitting said station identifying signals over one of said conductors of said party line, means at said calling station for controlling said line relay in accordance with impulses corresponding to the digits of a desired calling subscriber number, means at said calling station rendered effective during the first impulse of said series for connecting the identifying signal individual to said calling station to the other conductor of said calling line, signal responsive means in said register mechanism operative to register the station symbol corresponding to a calling one of said stations, means controlled by said line relay in response to said first impulse for connecting said signal responsive means to said other conductor of said calling line, and means in said signal responsive means operated in accordance with said calling station identifying signal on said other conductor for registering said calling station identifying symbol.

26. In a telephone system, a two-conductor party line, a plurality of stations on said party line, each of said stations having an individual station identifying symbol, switching apparatus, a register mechanism, a line relay and a hold relay in said register mechanism, means operated responsive to the initiation of a call on said line for controlling said switching apparatus to complete a connection from said calling line to said register mechanism in order to operate said line relay and said hold relay, a plurality of generators in said register mechanism for transmitting signals identifying each of said stations, means controlled in response to the operation of said hold relay for transmitting said station identifying signals over one of said conductors of said party line, means at said calling station for controlling said line relay in accordance with impulses corresponding to the digits of a desired called subscriber number, means at said calling station rendered effective during the first impulse of said series for connecting the identifying signal individual to said calling station to the other conductor of said calling line, signal responsive means in said register mechanism operative to register the station symbol corresponding to a calling one of said stations, means controlled by said line relay in response to said first impulse for connecting said signal responsive means to said other conductor of said calling line, means in said signal responsive means operated in accordance with said calling station identifying signal for registering said calling station identifying symbol, and means controlled in response to the operation of said signal responsive means for terminating the transmission of said station identifying signals over said one conductor of said calling line.

RAYMOND G. BIELENBERG.

REFERENCES CITED

The following references are of record in the file of this patent:

UNITED STATES PATENTS

| Number | Name | Date |
|---|---|---|
| 2,277,802 | Thies | Mar. 31, 1942 |

Certificate of Correction

Patent No. 2,562,594

July 31, 1951

RAYMOND G. BIELENBERG

It is hereby certified that error appears in the printed specification of the above numbered patent requiring correction as follows:

Column 26, line 20, for the indistinct word after "operating" read *said*; column 29, line 38, for "sation" read *station*; column 31, line 72, for "subscribed" read *subscriber*;

and that the said Letters Patent should be read as corrected above, so that the same may conform to the record of the case in the Patent Office.

Signed and sealed this 30th day of October, A. D. 1951.

[SEAL]

THOMAS F. MURPHY,
*Assistant Commissioner of Patents.*